United States Patent [19]
Steiner et al.

[11] Patent Number: 6,023,710
[45] Date of Patent: Feb. 8, 2000

[54] SYSTEM AND METHOD FOR LONG-TERM ADMINISTRATION OF ARCHIVAL STORAGE

[75] Inventors: Stefan R. Steiner, Issaquah; Luis Felipe Cabrera, Bellevue, both of Wash.

[73] Assignee: Microsoft Corporation, Redmond, Wash.

[21] Appl. No.: 08/997,518

[22] Filed: Dec. 23, 1997

[51] Int. Cl.[7] .................................................. G06F 17/30
[52] U.S. Cl. ............................................................ 707/204
[58] Field of Search ............................................. 707/204

[56] References Cited

U.S. PATENT DOCUMENTS

| | | | |
|---|---|---|---|
| 4,825,354 | 4/1989 | Agrawal et al. | 364/200 |
| 4,887,204 | 12/1989 | Johnson et al. | 364/200 |
| 4,914,571 | 4/1990 | Baratz et al. | 364/200 |
| 5,095,423 | 3/1992 | Gramlich et al. | 395/600 |
| 5,220,657 | 6/1993 | Bly et al. | 711/152 |
| 5,222,242 | 6/1993 | Choi et al. | 395/800 |
| 5,377,323 | 12/1994 | Vasudevan | 395/200 |
| 5,425,028 | 6/1995 | Britton et al. | 370/94 |
| 5,434,974 | 7/1995 | Loucks et al. | 395/200 |
| 5,493,607 | 2/1996 | Arumainayagam et al. | 379/88 |
| 5,574,906 | 11/1996 | Morris | 707/1 |
| 5,608,865 | 3/1997 | Midgely et al. | 714/1 |
| 5,765,173 | 6/1998 | Cane et al. | 707/204 |
| 5,778,395 | 7/1998 | Whiting et al. | 707/204 |

OTHER PUBLICATIONS

Baker, Steven, "New and Improved: NIS+ (Sun Microsystems Inc.'s Network Information Service+) (Net Worth) (Column)"; UNIX *Review*, vol. 11, No. 1, pp. 21–27; Jan. 1993.

Cabrera, Luis Felipe, et al., "QuickSilver Distributed File Services: An Architecture for Horizontal Growth," 2nd IEEE Conference on Computer Workstations, Santa Clara, CA; Mar. 7–10, 1988; pp. 23–37.

CAE Specification, System Mangement: Data Storage Management (XDSM) API, published by *The Open Group*; Feb. 1997.

Davies, D.W., et al., "Distributed System Architecture Model," Chapter 2; *Lecture Notes in Computer Science: Distributed Systems—Architecture and Implementation*; pp. 10–43; 1981.

Guy, Richard G., et al., "Name Transparency in Very Large Scale Distributed File System," *Proceedings of IEEE Workshop on Experimental Distributed Systems*; pp. 20–25; 1990.

Kistler, James J., and Satyanarayanan, M.; "Disconnected Operation in a Coda File System," pp. 213–225; 1991.

Ousterhout, John K. et al., "The Sprite Network Operating System," *Computer*; Vo. 21(2); Feb. 1, 1988 pp. 23–36.

Page, Thomas W., Jr., et al., "Management of Replicated Volume Location Data in the Focus Replicated File System," *USENIX Conference Proceedings*; pp. 17–29; Summer 1991.

(List continued on next page.)

*Primary Examiner*—Wayne Amsbury
*Attorney, Agent, or Firm*—Workman, Nydegger, Seeley

[57] ABSTRACT

Many archive and backup systems write multiple copies of at least portions of a single file to various archive or backup storage sessions. Such is the case where an initial backup occurs followed by incremental backups at various times after the initial baseline backup. The present invention simplifies the long-term administration of remote or archive storage by collecting multiple portions of the same files stored in different backup or archive storage sessions at different times into a single updated version of the file. This updated version may then be placed on backup or archive storage. The present invention identifies the various backup or archive sessions containing portions of the file of interest. It then retrieves these various portions and determines which of the portions are the most current version. The most current version of all portions are then assembled and coalesced into a single updated version. The system works with remote or local backup or archive storage and reduces the time necessary to retrieve information from a backup.

36 Claims, 6 Drawing Sheets

OTHER PUBLICATIONS

Robinson, .D.C., and Sloman, M.S., Domains: A New Approach to Distributed System Management; IEEE; pp. 154–164; 2988.

Satyanarayanan, M.; "Distributed File System," Chapter 9; *Distributed Systems*; pp. 149–188, 1989.

Satyanarayanan, Madhadev, "Scalable, Secure, and Highly Available Distributed File Access," *Computer*, pp. 9–20; May 1990.

Satyanarayanan, Mahadev, "Coda: A Highly Available File System for a Distributed Workstation Environment," IEEE; pp. 447–459; Apr. 1990.

Sidebotham, Bob, "VOLUMES—The Andrew File System Data Structuring Primitive," *Proceedings of EUGG Autum '86*; pp. 473–480; Sep. 1986.

Spector, Alfred Z.; "Thoughts on Large Distributed File Systems," *Proceedings of the German National Computer Conference*; pp. 1–10; Oct. 1986.

"Uniting File Systems," *UNIX Review*; vol. 7, No. 3; pp. 61–70.

Walker, Bruce, et al., "The LOCUS Distributed Operating System," *ACM Operating System Review*; vol. 17, No. 5; pp. 49–70; 1983.

Wedde, Horst F., et al., "Distributed Management of Replicated and Partitioned Filed Under Dragon Slayer," The Fourteenth Annual International Computer Software & Applications Conference, Chicago, Illinois; Oct. 31–Nov. 2, 1990; pp. 436–441.

Welch, Brent, and John Ousterhout, "Prefix Tables: A Simple Mechanism for Locating Files in a Distributed System," The 6th International Conference on Distributed Computing Systems, Cambridge, Massachusetts; May 19–23, 1986; pp. 184–189.

Welch, Brent, and Ousterhout, John; "Prefix Tables: A Simple Mechanism for Locating files in a Distributed System," *Proceedings of the IEEE Sixth Conference Distributed Computing Systems*; pp. 184–189; May 1986.

Yeo, A.K., et al., A taxonomy of Issued in Name Systems Design and Implementaion, *Operating Systems Review*; vol. 27 (3); Jul. 1993, pp. 4–18.

SYSTEM AND METHOD FOR LONG-TERM ADMINISTRATION OF ARCHIVAL STORAGE

BACKGROUND OF THE INVENTION

1. The Field of the Invention

The present invention relates to systems and methods for administration of archival storage and, more specifically, to systems and methods designed to allow for the long-term administration of information sent to backup or archival storage during multiple storage sessions.

2. The Prior State of the Art

Many advances have been made in computer hardware and software, but some general principles have remained constant. Although the cost of memory and data storage has continued to decrease, and the storage capacity of devices of a given size has continued to increase, there continues to be a difference in the cost of storing data depending on several factors, such as the medium used to store the data and the accessibility of the data. For example, it is generally more expensive to store a data word in cache memory than in system RAM. System RAM, in turn, is more expensive per storage word than magnetic disk storage. Magnetic disk storage is more expensive per storage word than archival storage. Thus, there continues to be motivation to move unused or less frequently used data to less expensive storage.

Another focus of the computer industry in recent years has been the development of reliable, fault-tolerant computer systems. These computer systems are designed to achieve a high degree of reliability and are often used in situations where computer failure would be costly. For example, certain computer systems in the banking and other industries support operations which must be available twenty-four hours a day, seven days a week. As part of these fault tolerant computers, a technique called journaling is often used to record various intermediate steps in certain transactions in order to create a record that allows rapid recovery from failure should one occur. These journaling systems are often adapted to allow a determination of the exact state of a particular operation when a failure occurred and resumption of the operation from that specific point. In addition, many systems that utilize journaling are also designed to recover from failure in a manner that preserves as much data and information as possible.

Systems where journaling or logging is used for various purposes tend to create files that grow in size. If all data sent to a journal or a log file was maintained in perpetuity, the size of the journal or log file would grow without bound. In order to limit the size of journal or log files, some systems allocate a fixed maximum size to the journal or log file. When the journal or log file approaches its maximum size, any new data placed in the file will overwrite the oldest data in the file. Such an approach maintains a rolling buffer of a fixed size that extends a certain time into the past. If sufficient space is allocated, many systems are capable of storing sufficient data to achieve the purpose of the journaling or log file.

In some situations, however, it is desirable to maintain a complete log file for a time that is longer than the amount of data that can be allocated to the journal or log file. In such situations, it is possible to take the oldest data in the journal or log file and send the data to archival storage. Such an approach reduces the amount of local storage space that is needed to store journal or log data, while, simultaneously, allowing a more complete history to be maintained. Such an approach also lowers the cost of maintaining journal or log files. This type of an approach, of necessity, leads to a situation where pieces of the journal or log file are sent to archival storage at different times. For example, during one archive storage session a certain percentage or portion of the log file is transferred to archival storage. After a certain period of time, another archive storage session may be initiated where additional data from the journal or log file is sent to archival storage.

If it ever becomes necessary to reconstruct the file, the various sessions must be loaded, one after the other in proper sequence, and the information stored in each session must be retrieved. Such a process is generally highly time consuming since each session of interest must be located, the media positioned to read the appropriate information from the session, and then the next session must be located. The process is repeated until all appropriate information has been retrieved from the various archive storage sessions and assembled in the proper order. The time to accomplish this task is often lengthy because archival storage tends to have a much slower access time than local storage. It would. therefore, be desirable to develop a system which could eliminate the lengthy retrieval time while still allowing data from a file to be stored in multiple archival sessions at different times.

The problem described above is not limited to journaling or logging systems. Normal operations of a system presents similar challenges. For example, some operations utilize large databases. The information in such a database is often highly critical to continued operations of an entity, and it is important to protect the data in the database from loss. To guard against loss, backup or archive copies of the database are often made and preserved in a manner which will allow important information to be recovered should a failure occur. Due to the size of the database, however, making such a backup can be a rather lengthy process. In order to reduce the time it takes to make a backup, many systems start with an initial or full backup and then simply make differential or incremental backups which send only the information changed since the last backup to backup or archival storage. Such practices create a situation where different portions of the same file are sent to backup or archival storage in different sessions at different times. If it becomes necessary to restore the database, the initial backup must be restored first, followed by each differential or incremental backup that has occurred afterward, each in its proper order. Only by following this procedure can the database be restored to its proper state. Depending upon the number of differential backups and the access time of the backup or archival media, such an operation can take a significant amount of time. These situations would also benefit from a mechanism that reduces the overall time necessary to restore the database to its proper state.

Many other situations exist where various portions of various files are sent to backup or archival storage over a period of time in different archive storage sessions. All these situations may benefit from a system or method which reduces the time necessary to restore information to its proper state if a failure should occur.

SUMMARY AND OBJECTS OF THE INVENTION

The foregoing problems in the prior state of the art have been successfully overcome by the present invention, which is directed to a system and method for long-term management of hierarchical storage. The present invention is designed to reduce the time it takes to recover information from archival storage when portions of a file have been sent to archival storage in different storage sessions.

When various portions of a file or various versions of a file must be restored from multiple archive storage sessions, the various pieces must be assembled and restored in the proper order. In the case of multiple incremental backups, this means starting with the initial or baseline backup and then restoring each incremental backup in turn. When various portions of a file, such as a journal or log file, must be restored from various archive storage sessions, the restoration process generally begins with the storage session containing the earliest portion of the data and continues with each storage session in turn until the entire journal file is restored. The present invention reduces the overall time necessary to make these restoration processes by assembling or coalescing all pieces from the various storage sessions into a single file that can be restored from a single storage session when needed.

The present invention begins the process of coalescing various pieces from different storage sessions into a single file by first identifying which storage sessions have pieces of the file to be restored. Such information is generally found in an index or catalog associated with each archive storage session. If a copy of the index or catalog from each storage session is maintained on local storage, this step may be accomplished without accessing archival storage. If such information is not maintained locally, then the indexes or catalogs of each storage session must be read from archival storage to identify where all portions of a particular file may be found. In the alternative, if only certain files are of interest, then the present invention may maintain a local list of archive storage sessions that contain pieces of the files of interest.

Once the storage sessions where pieces of the file of interest are located have been identified, the next step is to retrieve the various portions of the file from the various archive storage sessions and coalesce the most recent version of all portions of the file into a single file that contains the most recent version of all pieces of the file. This coalesced version can then be written to archival storage. In conjunction with writing of the most recent version of the file to archival storage, it may also be desirable to indicate that the previous versions of the file have been superceded and, hence, should not be used. This may be done by invalidating the previous data written to archival storage or by any other means which indicates to the system that the version has been superceded by the coalesced version of the file.

In order to coalesce different portions of a file written to archival storage at different times into a single file containing the most up-to-date version of all portions of a file, a mechanism must be used to determine the most recent version of various portions of a file. Such a mechanism may be implemented in a wide variety of ways. For example, in the case of a journal or log file that is continually appended to, existing information in the file is never modified. Whenever new information is added to the file, the new information is simply appended to the existing information. Thus, one storage session may contain blocks 1 through N. The next storage session would begin with block N+1 and go to block M. Thus, when comparing these two storage sessions it is clear that information must be retrieved from both sessions and simply reassembled in the proper order. In this situation, determining the most recent version is simple since there is no overlap of the information in each archive storage session.

In other situations, different archive storage sessions may contain different versions of the file or different versions of portions of the file. In a situation where incremental backups are made, one archive storage session may have version 1 of a particular set of records or storage blocks of a file while session 2 may have version 2 of the same storage blocks. It can be a complicated task to determine which version of the storage blocks should be used. The task can be simplified by associating a time stamp or other indicator of the versions of the files or portions of the file. In a system which uses incremental backups, it may generally be presumed that the version with the latest time stamp is the most current version of the information contained therein. Thus, in some instances identifying the most current version of a file or portions of a file may be performed comparing the time stamps associated with the data and selecting the data with the most recent time stamp. In other instances, other mechanisms may need to be used such as comparing time stamp or signature attributes associated with individual files or portions of a file. Such a time stamp or other signature attribute may be associated with an entire file, an entire version of a file, or various portions of a file.

Accordingly, it is a primary object of this invention to provide a system and method for long-term archival storage administration that reduces the time necessary to restore data from archival storage. Another object of the present invention is to provide a system and method for long-term data administration which facilitates finding and administering various portions of a file written to multiple archive storage sessions.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
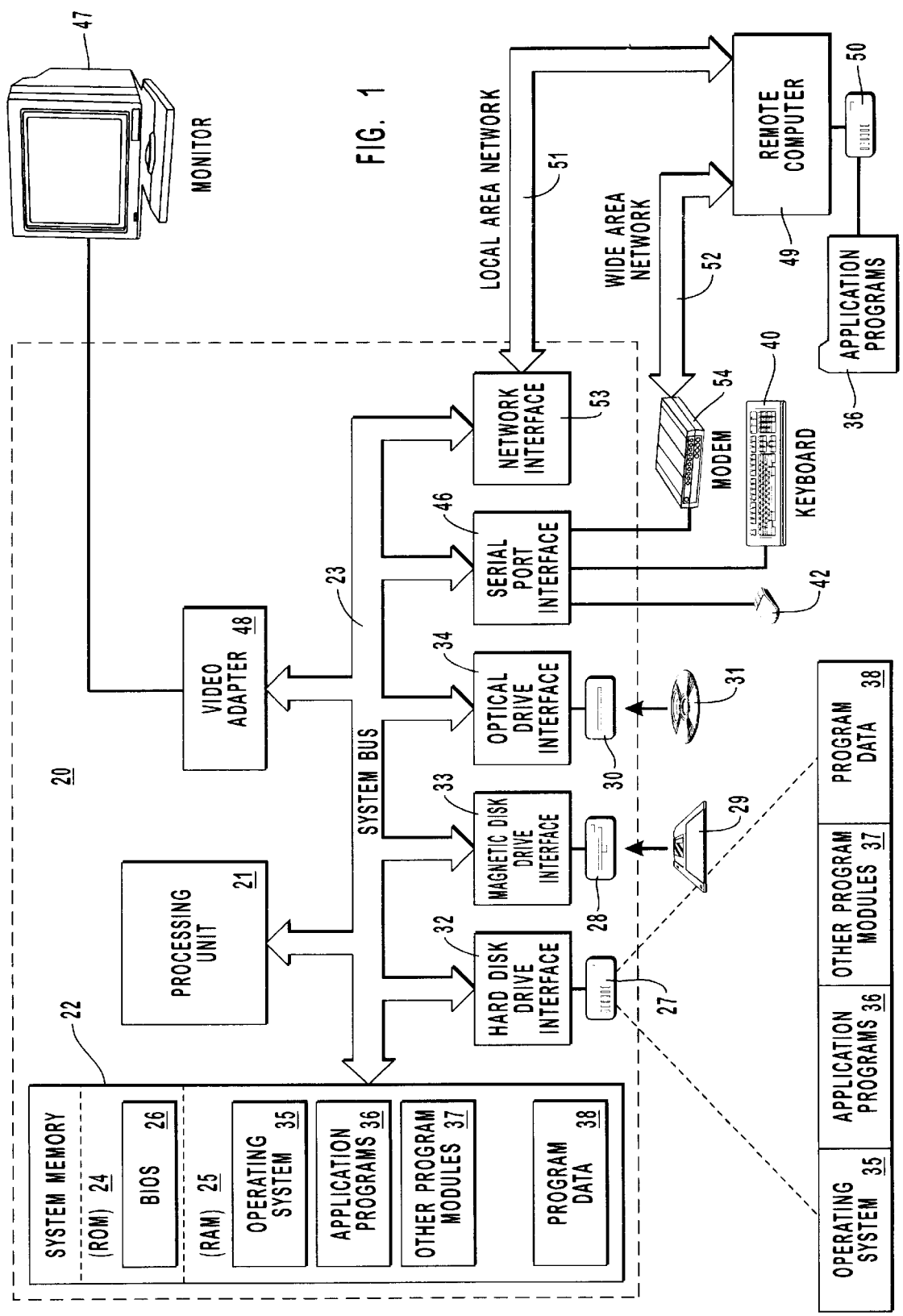
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20. including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 3 1, it should be appreciated by those skilled in the art that other types of computer readable media which can store data that is accessible by a computer, such as magnetic cassettes, flash memory cards, digital video disks. Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. I include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Although backup and archive systems are often used in slightly different contexts, the terms will be used interchangeably in this patent. Within the context of this patent the terms will be used to refer to systems, processes, and so forth that send a copy of at least some information stored locally to backup or archive storage. Such backup or archive storage may be local or remote storage.

Figure 2:
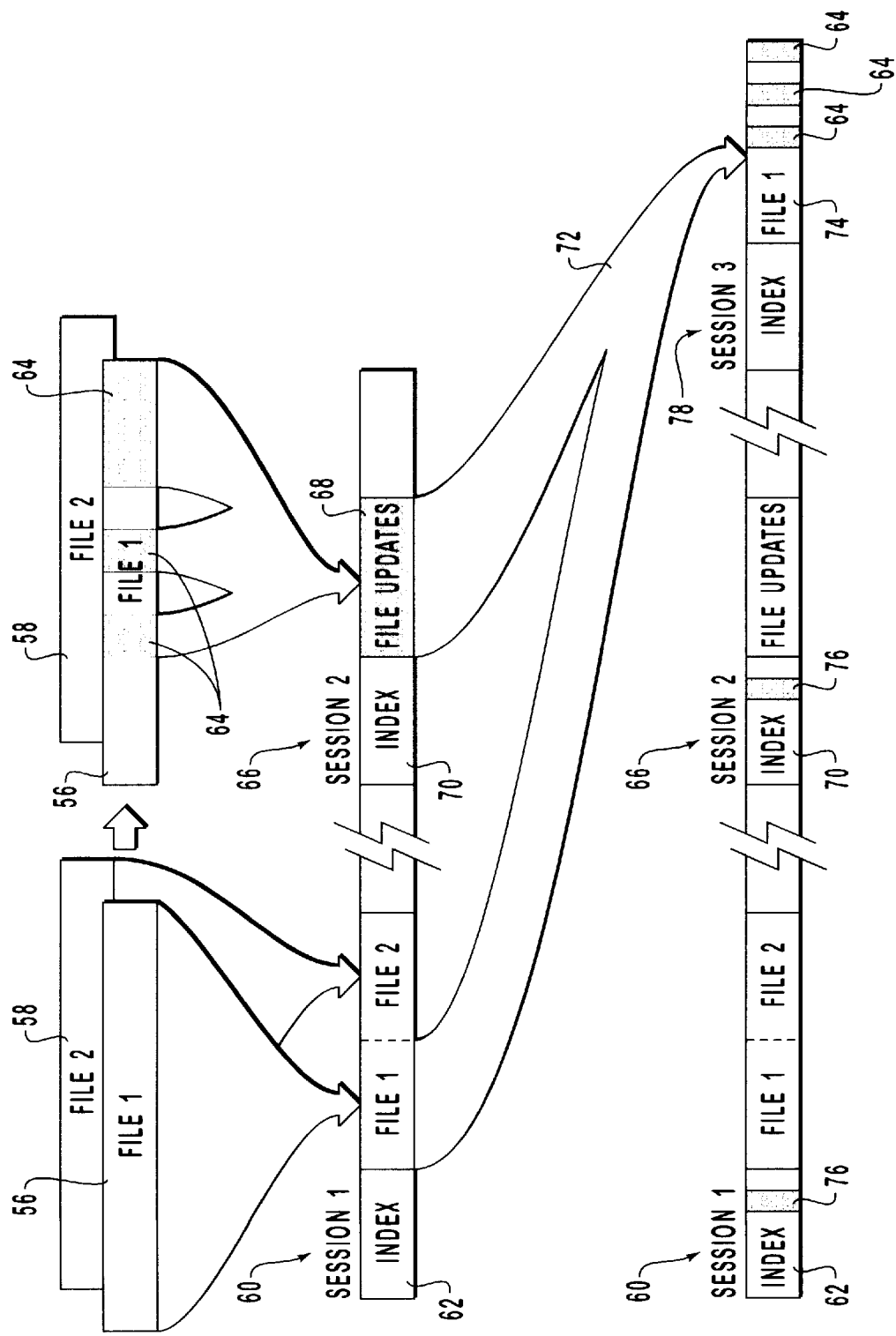
FIG. 2 is a high-level diagram illustrating the process of coalescing various portions of a file from multiple archival storage systems into a single file.

Referring next to FIG. 2, a top-level diagram of the process of coalescing multiple portions of a file into a single archive storage session is presented. As previously discussed, various situations arise where multiple portions of a file may be written to different archive storage sessions. For example, in the case where incremental backups are done, each backup session contains only those changes that have occurred since the last backup session. In some systems, entire files that have changed since the last incremental backup are written to backup or archival storage during an incremental backup session. However, if only a portion of a file has changed, only those portions of the file that have changed need be written to archival storage. Thus, some systems perform incremental backups only on those portions of the file that have changed. In the case of a journal or log file, new data is appended to the end of a file. After a portion of the log or journal file has been sent to backup or archival storage, that portion of the file may be deleted. Thus, successive backup or archival sessions of a journal or log file may contain different portions of the file.

The process of writing different portions of a file to archival or backup storage during multiple archival sessions is illustrated in FIG. 2. As illustrated in FIG. 2, file 56 and file 58 are written to archive storage session 1, illustrated generally as 60. When files are placed into an archive storage session, it is generally necessary to identify which files have been sent to the session. Thus, there generally exists means for identifying which of a plurality of archive storage sessions contains at least a portion of a particular file. Such a means may include various mechanisms to identify a file in an archive session. For example, an index or catalog of the archive session may be kept which is then searched by an appropriate mechanism to identify which files are in the archive session. By way of example, and not limitation, in FIG. 2 such means for identifying may comprise index 62. As illustrated below, such a means may also comprise mechanisms for reading or searching catalogs or indexes. Index 62 may be stored as part of archive storage session 60 or may be stored separately from the archive storage session, or copies may be stored in multiple locations, such as both with the archive storage session and in another location. Index 62 preferably contains at least a listing of those files which are contained within session 1.

Suppose that at some time later, file 56 had various modified portions. In FIG. 2, the modified portions of file 56 are illustrated by shaded regions 64. Assume now that a second archive storage session, illustrated in FIG. 2 generally as 66, was initiated and modified portions 64 of file 56 are written to archive storage session 66. Archive storage session 66 would then include file 56 updates illustrated in FIG. 2 as 68. Session 66 would also have associated therewith an index, such as index 70. As previously discussed, index 70 may be stored in various locations such as with session 66, in a storage location separated from session 66 such as local storage, or in multiple locations such as both with session 66 and in a location separate from session 66.

When multiple archive storage sessions have multiple portions of a file such as illustrated in FIG. 2, if the information should ever need to be retrieved from archival storage then information must be retrieved from all archive storage sessions in the proper order to ensure that all relevant information is retrieved and applied in the proper order. In the example in FIG. 2, this would mean locating archive storage session 60 and retrieving the portions of file 56 stored therein, then locating archive storage session 66 and retrieving the portions of file 56 stored therein. The portions of file 56 retrieved from session 66 would then be applied over the information retrieved from session 60 in order to update file 56 with modified portions 64. If session 60 and session 66 are stored on a media such as streaming tape, then the time necessary to locate the proper storage session and retrieve the desired information can be significant. Similar concerns may exist for archival storage when it is located remotely from the local system since sometimes accessing remote storage can be a high-latency event. In addition, writing multiple sessions to archival storage also requires that all previous versions be maintained indefinitely. For example, if archive storage sessions were created once a week then all sessions since the very first archival session must be maintained in order to provide the baseline backup. This can create logistical problems when storing and maintaining such a volume of archival storage media.

In order to reduce the problems associated with long-term administration of archival storage, the present invention is designed to collect various pieces of a particular file and coalesce these pieces into a single updated version of the file that can then be stored in an archive storage session and retrieved when needed. Thus, embodiments within the scope of the present invention may comprise means for coalescing the most recent version of all portions of a file into a single copy of the file that contains the most recent version of all portions of the file. By way of example, and not limitation, in FIG. 2 such means for coalescing is illustrated by arrow 72. Arrow 72 shows the various portions of file 56 being collected and coalesced in the proper order into a single copy, shown in FIG. 2 as 74. As illustrated in FIG. 2, file 74 has updated portion 64 applied in the proper order to create the most current version of the file. The means for coalescing illustrated in FIG. 2 as arrow 72 may comprise a wide variety of systems and mechanisms that retrieve various portions of a file from appropriate locations and combine them in the proper order to create a current version of the file of interest. Further examples of such means are presented below.

Once information has been retrieved from a particular archive storage session and used to create an updated version of the file, it may be desirable to mark the data in older archive storage sessions to indicate that the data has been superceded by a more current version. For example, certain embodiments may comprise means for indicating that a copy of at least a portion of a file in a storage session has been superceded by a more recent version. Various mechanisms may be used to implement such a means. For example, if the archive storage media allowed easy removal of portions of the data of an archive storage session without unduly disturbing the data that still remains in the archive storage session, such a means may comprise a means for deleting information from an archive storage session. In the alternative, it may not be necessary to delete the data from an archive storage session. It may be sufficient to simply mark the data in the archive storage session as invalid or superceded. This may be accomplished by means for making a notation in the index of an archive storage session. In still other embodiments, the means for indicating may comprise means for removing entries in an index. In this embodiment, the entry for the data that has been superceded may be removed from the index. In FIG. 2, the means for indicating that a copy of at least a portion of a particular file is a storage session has been superceded by a more recent version is indicated by shaded portion 76 in index 62 and index 70. The shaded portions are designed to indicate that the data related to file 56 stored in those storage sessions has been superceded. These examples of a means for indicating are given by way of example and not limitation.

In FIG. 2, the coalesced version of file 74 is stored in a new archive storage session, illustrated in FIG. 2 as archive storage session 78. This is representative, for example, of an embodiment which places a coalesced version of the file into a new archive storage session. Such an embodiment, however, is given by way of example and not limitation. Other embodiments exist which may place the coalesced version in an existing archive storage session. For example, it may be possible to rewrite session 66 in order to remove updates 68 and add the coalesced version 74. This would allow an updated version of the file to be stored in an archive storage without creating a new archive storage session.

Figure 3:
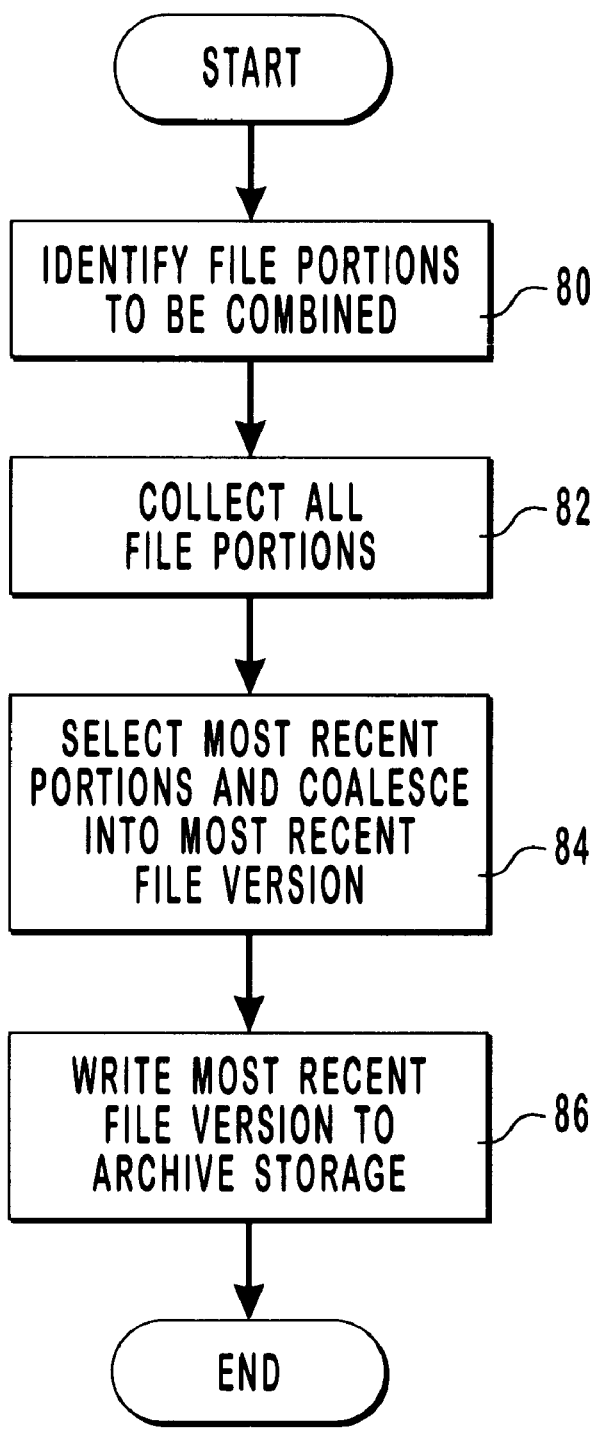
FIG. 3 is a top-level flow diagram of one embodiment of the present invention.

Referring now to FIG. 3, a high-level flow diagram of one embodiment of the present invention is illustrated. As previously illustrated in conjunction with the discussion of FIG. 2, the present invention combines various portions of a file that have been written to multiple archive storage sessions into a single updated version of a file. Thus, embodiments within the scope of this invention may comprise means for identifying which of a plurality of archive storage sessions contain at least a portion of a particular file. In other words, embodiments may comprise a mechanism to identify which archive storage sessions contain at least portions of a file of interest. By way of example, and not limitation, in FIG. 3 such means is illustrated by step 80. In step 80, the various portions of a file to be combined are identified. This step may, for example, examine the catalogs or indexes of various archive storage sessions to identify which archive storage sessions contain information from the same file. As previously mentioned, such indexes may be stored locally, with the archive storage session, or both. Step 80 may be initiated on a periodic basis or may be initiated in response to a directive to coalesce a particular identified file into a most current version. In other words, in some embodiments of the present invention it may be desirable to examine the indexes associated with various archive storage sessions to determine whether the indexes contain portions of the same file. If they do, then it may be desirable to coalesce those versions of the file into a single updated version. In the alternative, a user or other process may identify a particular file that is to be coalesced and then a search can be initiated to identify which archive storage sessions contain portions of that file. In either case, a means for identifying is employed.

In some embodiments of the present invention, it may be desirable to establish policies that determine when various portions of a file are coalesced into a single updated version. Such policies may, for example, consider various properties and parameters to determine whether the coalescing process should be initiated. As an example, perhaps it is desirable to delay coalescing of a file until a certain number of archive storage sessions contain at least a portion of a file. As another example, perhaps the coalescing of a file is initiated only when a certain amount of data is scattered among various archive storage sessions. As yet another example, perhaps archive storage sessions are only maintained for a certain time. In other words, archive storage sessions older than a given date may be discarded or reused. In such situations, it may be desirable to coalesce any information in archive sessions that will be discarded into a current version of the file which is then maintained in an archive storage session that will be retained. Embodiments within the scope of this invention may comprise any type of coalescence criteria which helps an embodiment of the present invention to determine when and which files should be coalesced into a current version.

After portions of the file which should be coalesced have been identified, the next step is to collect all portions of the file. This is illustrated in FIG. 3 by step 82. Note that it may not be necessary to collect all portions of the file in the sense of retrieving them from archival storage. It may simply be enough to collect information about which files should be retrieved from archival storage. In addition, it may be desirable to collect information that will allow the most current version of the various portions of the file to be identified.

After the information in the files has been collected, or after information about which files should be retrieved has been collected, the next step, as illustrated in FIG. 3, is to select the most recent portions of the file and to coalesce them into a version that contains the most recent information. This is illustrated in FIG. 3 by step 84. Step 84 represents an example of means for coalescing the most recent version of various portions of a file into a single copy that contains all the most recent portions of a file.

To identify the most recent portions of the file, embodiments within the scope of this invention may comprise means for determining the most recent version of at least a portion of a particular file. In other words, if the various portions of a file are to be coalesced into a single version that contains the most recent version of all portions of a file, a mechanism must exist to compare the information contained in two archive storage sessions and determine which of the two archive storage sessions contains the most recent information. As explained in greater detail below, where archive storage sessions store complete copies of the file, such a means may be a time stamp indicating which archive storage session contains the most recent version of a file. However, if various portions of a file are stored in different archive storage sessions, then it becomes necessary to identify which of the different archive storage sessions contain the most current information. In some instances, portions of a particular file stored in one archive storage session may not exist in another archive storage session. In these situations, such means for determining should identify those portions that exist in only one archive storage session so that they can be incorporated into the coalesced version. On the other hand, when two copies of a portion of a file exist in two archive storage sessions, it is important to be able to identify which of the two copies is the most current. Such a means may again be a time stamp or other mechanism as disclosed in greater detail below.

Once the most recent versions of all portions of a file have been coalesced into a single updated version, the updated version is generally placed on archival storage. Thus, embodiments within the scope of this invention may comprise means for writing the coalesced version to an archive storage medium. By way of example, and not limitation, in FIG. 3 such means is illustrated by step 86. Step 86 indicates that the coalesced copy should be written to archive storage. Any mechanism which allows an embodiment of the present invention to write a coalesced version onto archive storage may be part of such a means. Such means may comprise, for example, various drivers, I/O systems, subsystems, computer systems, networks, and so forth which allow an embodiment of the present invention to write information to archive storage in an archive storage session. As previously discussed, the coalesced version may be placed into a new archive storage session or may be placed in an existing archive storage session. The choice as to whether to place the coalesced version into a new archive storage session or into an existing archive storage session will be determined, in large measure, by the type of archive storage medium used and the format of archive storage sessions.

Figure 4A:
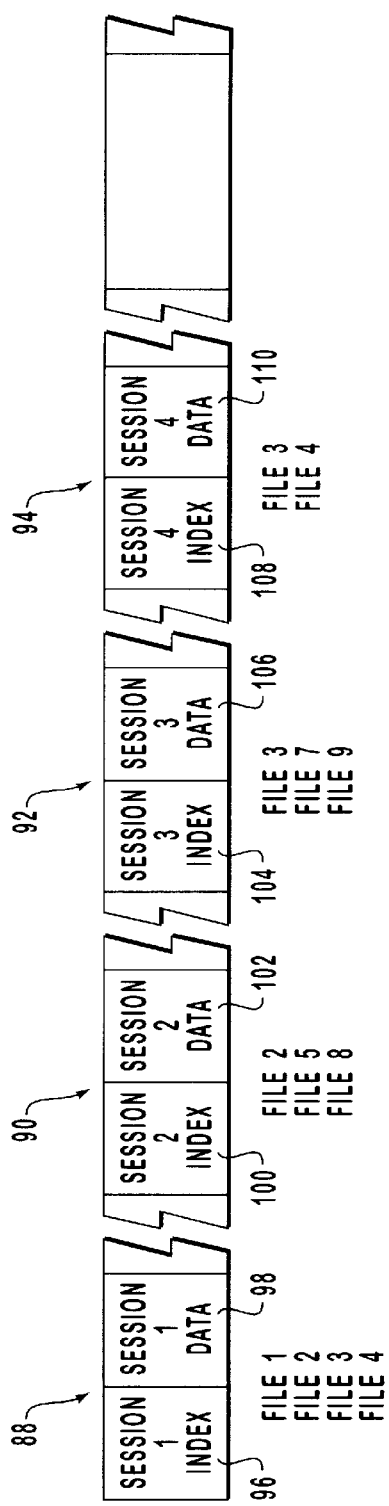
FIGS. 4a and 4b illustrate the process of collecting multiple pieces from multiple files into a single archival storage session.
Figure 4B:
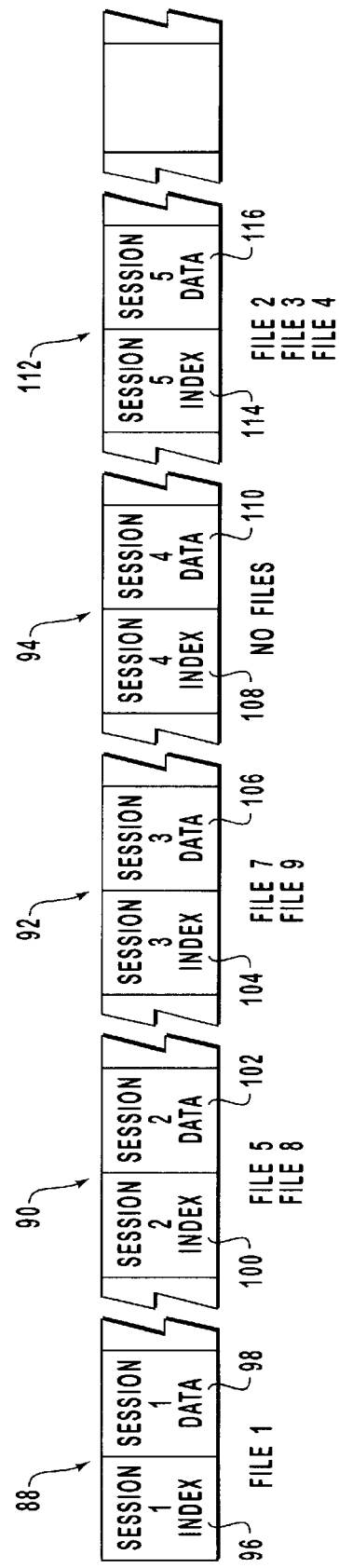

Turning now to FIGS. 4a and 4b, an example of how multiple files may be coalesced in a single session is illustrated. Referring first to FIG. 4a, four archive storage sessions are illustrated. In FIG. 4a these are illustrated generally as session 88, session 90, session 92, and session 94. Each session has associated therewith an index and a data portion. As illustrated in FIG. 4a, session 88 contains at least a portion of file 1, file 2, file 3, and file 4. Session 90 contains at least a portion of file 2, file 5, and file 8. Session 92 contains at least a portion of file 3, file 7, and file 9. Session 94 contains at least a portion of file 3 and file 4. An examination of the sessions illustrated in FIG. 4a reveals that file 2 has at least portions thereof stored in sessions 88 and 90, file 3 has at least portions thereof stored in sessions 88, 92, and 94, and file 4 has at least portions thereof stored in sessions 88 and 94. This means that files 2, 3, and 4 may be coalesced into more current versions. The general steps illustrated in FIG. 3 may be used to coalesce these files into updated copies.

Referring now to FIG. 4b, after the general steps illustrated in FIG. 3 have been performed to coalesce all files having at least portions residing in multiple archive sessions, the illustration of FIG. 4b results. As indicated in FIG. 4b, all portions of files 2, 3, and 4 have been coalesced into a new archive session illustrated generally as 112. In the alternative, as previously discussed, the coalesced files could be placed in an existing archive session such as session 94 which has no files retained therein. As illustrated in FIG. 4b, after files 2,3, and 4 have been coalesced, session 88 only retains information from file 1, session 90 retains information from files 5 and 8, session 92 retains information from files 7 and 9, and session 94 retains information from no files. As previously explained, this result may be accomplished either by removing information from the archive sessions, marking the information as invalid, or in some other manner indicating that the data in the session has been superceded current version. As illustrated in FIGS. 4a and 4b, multiple files may be coalesced into a single archive session.

As previously discussed, embodiments within the scope of this invention may comprise means for determining the most recent version of at least a portion of a particular file. Such a means allows examination of two copies of at least a portion of a file and allows a determination as to which of the copies is the most current. Many mechanisms may be used to implement such a means. Some of these have been previously discussed. For example, a time stamp may be stored with each archive storage session. Such a time stamp allows the most current version to be determined by comparing the time that the archive session was written. In addition, direct comparison of attributes of the file itself may allow a determination as to the most current version of a portion of a file.

Figure 5:
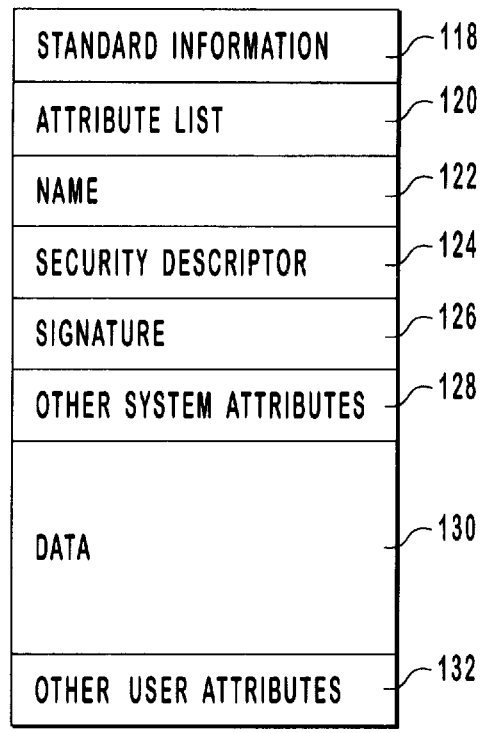
FIG. 5 contains representative file system attributes that include a suitable signature attribute.

Referring now to FIG. 5, a representative attribute list for a suitable embodiment is illustrated. The attribute list illustrated in FIG. 5 is given by way of example and not limitation. The exemplary attribute list of FIG. 5 will be used to illustrate how various attributes of a file may be used to determine the most current version. The attributes illustrated in FIG. 5 represent a modified list of the attributes used by the NTFS file system developed specifically for Microsoft Windows NT. The NTFS file system is described in greater detail in *Inside the Windows NT File System*, by Helen Custer. published by Microsoft Press and incorporated herein by reference.

The exact number or type of attributes used for a file is generally wholly dependent upon the particular operating system or the particular file system utilized. In FIG. 5, file attributes comprise, for example, standard information attribute 118, attribute list 120, name attribute 122, security descriptor attribute 124, signature attribute 126, other system attributes 128, data attribute 130, and other user attributes 132. Standard information attribute 118 represents the standard "MS-DOS" attributes such as read-only, system, hidden, and so forth. Attribute list 120 is an attribute used by NTFS to identify the locations of additional attributes that make up the file, should the file take up more than one storage record in the master file table. The master file table is the location where all resident attributes of a file or directory are stored. Name attribute 122 is the name of the file. A file may have multiple name attributes in NTFS. for example, a long name, a short MS-DOS name, and so forth. Security descriptor attribute 124 contains the data structure used by Windows NT to specify who owns the file and who can access the file. These attributes are described in greater detail in *Inside the Window NT File System*, previously incorporated by reference.

Signature attribute 126 is an attribute that represents various signature-type information that may be stored with a file. Signature attributes can be used to help identify which of multiple copies of at least a portion of files are the most current. In other words, such a signature attribute may be an example of the means for determining the most recent version, previously described. An example of a particular type of signature attribute and how it can be used in the present invention is illustrated below. Other system attributes 128 represents any other system attributes that may be part of a file. Data attribute 130 is an attribute used to store user controlled data in the file. For example, the document portion of a word processing document is typically stored in the data attribute of a file. In the NTFS file system, a file can have multiple data attributes. Other user attributes 132 represents any other user defined attributes stored with the file.

A time stamp may be stored as part of the standard MS-DOS attributes in standard information attribute 118. This time stamp generally represents the time that the file was created or last modified. The time stamp for a file is typically updated whenever any change is made to any portion of the file. For example, updating data attribute 130 typically causes the time stamp in standard information attribute 118 to be updated. Thus, the time stamp may be a reliable indicator of modifications made to small parts of the data attribute of a file. However, certain attributes of the file may be updated in certain circumstances without any change to the time stamp of the file. For example, if one of the names in the name attribute is modified, the time stamp for the data of the file is not updated. Thus, the time stamp is not necessarily a good indicator that all attributes of a file remain unchanged. Put another way, comparing two time stamps may allow the most recent data attribute to be identified but it will not necessarily allow the most recent version of the other attributes to be identified. In order to more fully identify the most current version of these other attributes, other mechanisms such as directly comparing the attributes or generating information that is placed in a signature attribute may be used.

The attributes of a file are stored in basic units of storage often referred to as allocation units. It is possible to assign a unique change identifier (UCI) to each allocation unit. Then when the information in the allocation unit changes the associated UCI can be changed. If the UCIs are assigned according to a criteria which allows an earlier copy of the allocation unit to be distinguished from a later copy of an allocation unit, then it is a simple matter to identify the most current version of an allocation unit by comparing the associated UCIs. This concept is illustrated in FIGS. 6a and 6b.

Figure 6A:
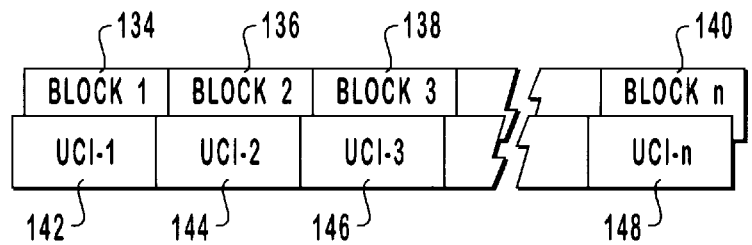
FIGS. 6a and 6b illustrate the process of assigning signatures to subportions of a file.

Referring first to FIG. 6a, various allocation units, called blocks, are illustrated. Blocks 134, 136, 138 and 140 are shown as exemplary. Associated with each block is a UCI. In FIG. 6a the illustrated blocks have associated UCIs 142, 144. 146 and 148. Now suppose that block 136 changes. In this situation, the associated UCI would also be changed according to some pattern that allowed an earlier version of the UCI to be distinguished from a later version. These changes are illustrated in FIG. 6b by shading block 136 and its associated UCI 144. In addition, FIG. 6b shows that block 150 has been added along with its associated UCI 152.

This short discussion demonstrates that if the UCIs are assigned in a manner that allows an earlier version of a UCI to be distinguished from a later version, then identifying the most recent version of the associated allocation unit is a simple matter. Any pattern which assigns UCIs so earlier versions may be distinguished from later versions can be utilized. One embodiment uses a UCI with sufficient number of bits so that the UCI may be incremented every time the associated allocation unit is changed without the likelihood that the UCI will "roll over" and reset to zero. Assigning UCIs in this fashion means that the higher the UCI number the more current the version of the associated allocation unit. The various UCIs may then be assembled and stored in a single attribute, such as signature attribute 126 of FIG. 5. More information regarding assigning signatures in this manner can be found in co-pending U.S. patent application No. 09/010,097 entitled "NATIVE DATA SIGNATURES IN A FILE SYSTEM." now U.S. Pat. No. 5,978,814, incorporated herein by reference.

Figure 6B:
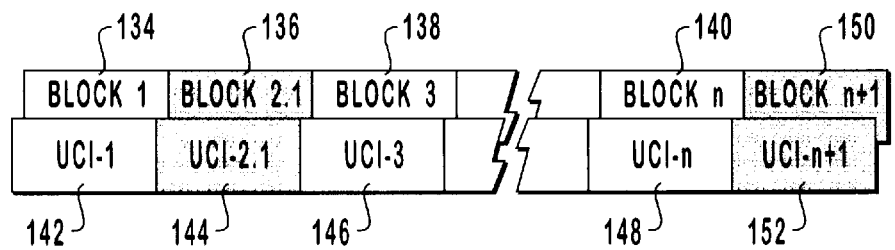

The concept discussed and illustrated in FIG. 6a and 6b can be extended to any level of granularity. In other words, a UCI may be assigned to each attribute, or even portions of an attribute, in a file. The most recent version of the attributes or a portion of an attribute can then be identified by comparing the associated UCIs. Additionally, such a scheme may allow the amount of information written to archival storage during a single storage session to be reduced. For example, if relatively few attributes or allocation units have changed, then only those that have changed need be written to archival storage. As long as the information written to archival storage allows the information written to archival storage to be reinserted into the file in the proper location, there is no need to write the entire file to archival storage. If, however, the entire file is written to archival storage, then the most current portions of that file can be identified by comparing the UCIs associated with the attributes of one file with the UCIs associated with the attributes of another file. Thus, the time stamp in standard information attribute 118, signature attribute 126 and the individual UCIs illustrated in FIGS. 6a and 6b all represent examples of components that may comprise at least a portion of means for determining the most recent version of at least a portion of a particular file.

Figure 7:
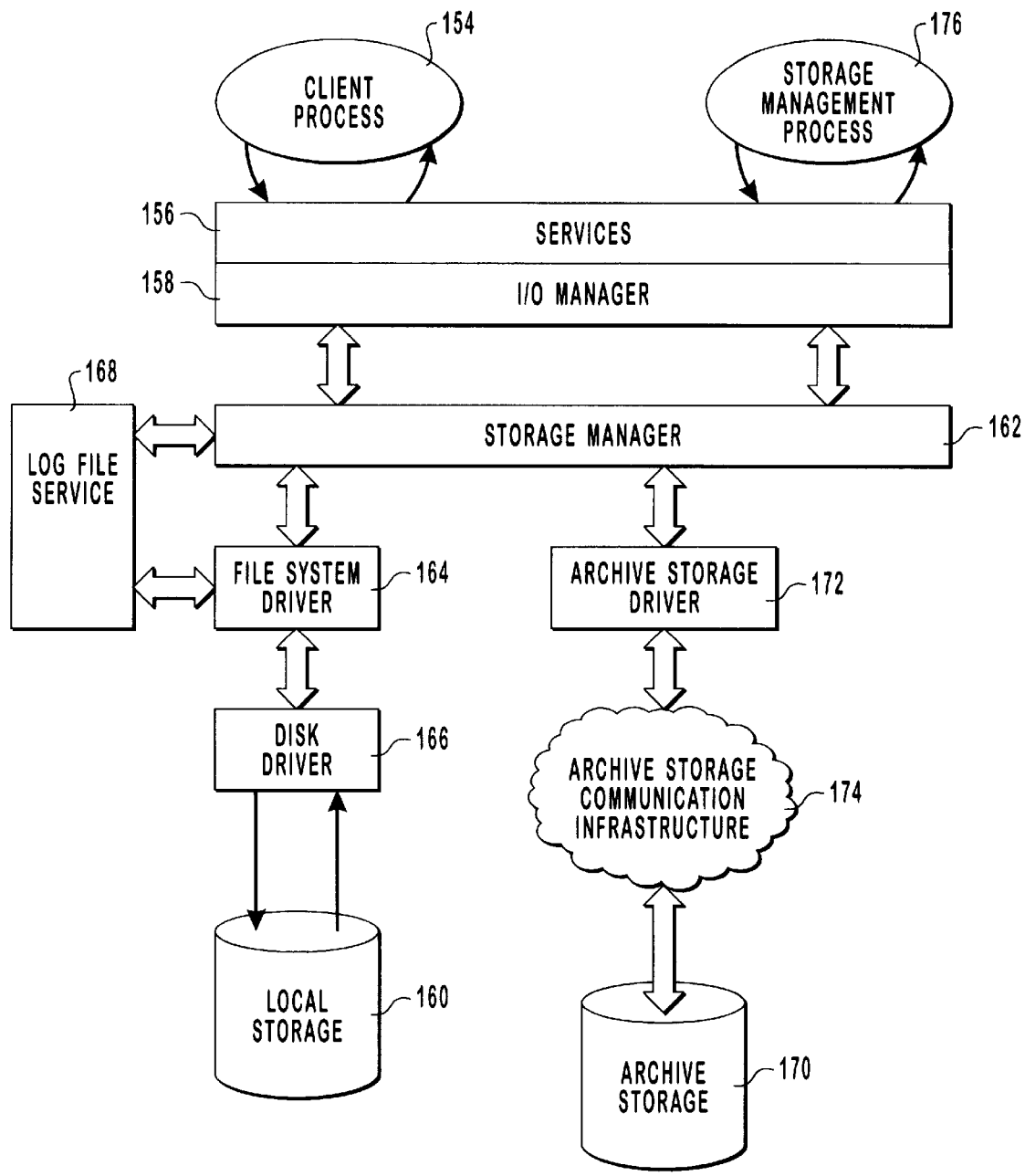
FIG. 7 is an embodiment of the present invention.

Referring now to FIG. 7, one embodiment of the present invention is illustrated. This embodiment uses an I/O system having a plurality of layered driver means for processing I/O requests to implement many of the concepts discussed herein. In FIG. 7, client process 154 makes an I/O request to operating system services 156. Operating system services 156 may ultimately forward the request to I/O manager 158. Assuming the I/O request involved local storage 160, the I/O request would be forwarded through storage manager 162 to file system driver 164. In the alternatives the I/O request may be passed directly to file system driver 164, depending upon the implementation of the system. File system driver 164 would then translate the I/O request from a file name to a particular location on local storage 160. The translation process may also include the number of data blocks that should be read from or written to local storage 160. This information is then passed onto the next driver, as for example, disk driver 166. Disk driver 166 takes the location and number of data blocks to be read or written and translates them to the appropriate control signals to retrieve or write the desired information from local storage 160. The data retrieved may then be passed back from disk driver 166 to file system driver 164 and ultimately back to client process 154. Status information may be returned in the same manner. From the above example, it should be clear that file system driver 164 generally takes information in the form of a file or path name and translates that to appropriate location information so that disk driver 166 may perform the appropriate I/O request involving local storage 160.

The embodiment illustrated in FIG. 7 also includes log file service 168. Log file service 168 may perform a variety of functions including tracking various information so that should an error occur, local storage 160 will not be left in an unreadable state. The NTFS of Microsoft Windows NT uses such a log file service to record transactions that will modify the structure of an NTFS volume. NTFS uses several types of records that are written to the log file service to provide robust recovery from possible errors. More information regarding how NTFS uses the log file service can be found in *Inside the Windows NT File System*, previously incorporated by reference. Generally, log file services, such as log file service 168 have an "infinite" log area where records are written to track various information. Such a log file service typically uses logical sequence numbers (LSNs) to identify records written to the log file. As the log file service cycles through the file, it increases the value of the LSNs. LSNs are typically selected so that the number of possible LSNs is so large as to be virtually infinite. In many embodiments, it may be desirable to save the "infinite" logging area of log file service 168 to archival storage on a periodic basis.

In FIG. 7 storage manager 162 is responsible for initiating archive storage sessions and for writing data to the archive storage session. Storage manager 162 may also be responsible for reading data from an archive storage session when necessary to retrieve desired information. Finally, storage manager 162 may be responsible for initiating a session that coalesces portions of files into updated versions. In the alternative, any of these functions may be handled by one or more other drivers in a layered relationship with storage manager 162. The exact implementation will be dependent upon design choices or the particular operating environment selected to implement the present invention.

In FIG. 7, archive sessions are stored on archive storage 170. Storage manager 162 may use archive storage driver 172 to write information to or read information from archive storage 170. Between archive storage driver 172 and archive storage 170 lies archive storage communication infrastructure 174. Archive storage communication infrastructure 174 represents any type of infrastructure necessary to communicate information to archive storage 170 and receive information from archive storage 170. For example, archive storage 170 be may a locally connected storage device. In this situation, perhaps archive storage driver 172 is connected directly to archive storage 170 or, perhaps, archive storage driver 172 has a separate hardware driver, analogous to disk driver 166, between itself and archive storage 170. In other embodiments, archive storage may be connected remotely and accessed through networks, other computer systems, other subsystems, dial-up connections, wide-area connections, local-area connections, or any other mechanism. Thus, archive storage communication infrastructure 174 represents any mechanism necessary for archive storage driver 172 to communicate data from or to archive storage 170.

When appropriate conditions are met, storage manager 162 may initiate an archive storage session with archive storage 170 or a session to coalesce files stored on archive storage 170. Storage manager 162 may determine when to initiate such sessions by itself or through the help of other mechanisms. For example, a dedicated process such as storage manager process 176 may initiate or help initiate an archive storage session and/or sessions to coalesce files. Storage manager process 176 may issue commands or send information through system services 156 and I/O manager 158 to storage manager 162. Other embodiments may utilize storage manager 162 either alone or in combination with other entities to decide to initiate an archive storage session and/or a session to coalesce files. Thus, embodiments within the scope of this invention may comprise means for initiating a session when designated criteria are met. In the embodiment illustrated in FIG. 7, such means may be incorporated into storage manager 162, storage manager process 176, or any other component that is part of the embodiment.

Once a session has been initiated that will coalesce information from a plurality of archive storage sessions into a single updated file, the present invention needs to identify which archive storage sessions contain portions or versions of files of interest. As previously discussed, this may be performed by searching an index or catalog of the storage sessions. Thus, embodiments within the scope of this invention may comprise means for storing an index for each of a plurality of archive storage sessions. These indexes or catalogs may comprise information that identifies the files transferred to the archive storage during an associated archive session. As previously discussed, such an index may be stored either on local storage, on archive storage, in another location, or in some combination thereof. Thus, in FIG. 7 means for storing an index may comprise local storage 160, archive storage 170, or any combination thereof.

As previously discussed, embodiments within the scope of this invention may comprise means for determining the most recent version of at least a portion of a particular file from between two copies of that portion. As previously discussed such a means may comprise signatures, time stamps, or other information. Such a means may also comprise the mechanism that examines this information and makes the determination as to which copy is the most current version. In FIG. 7, such a means would be incorporated, for example, into storage manager 162. Such a means may comprise a mechanism to compare two copies of information that are used to identify which version is the most current. As another example, such a means may be incorporated into storage management process 176.

As previously discussed, embodiments within the scope of this invention may comprise means for coalescing the most recent version of all portions a the file into an updated version of a particular file. In FIG. 7, such means may be incorporated into storage manager 162. Thus, as information is retrieved from various archive storage sessions on archive storage 170, the information may be returned to storage manager 162 where it is examined and the determination is made as to the most current version. The most current version may then be coalesced by storage manager 162 into a single most current version. Also as previously discussed, once information has been superceded it may be desirable to place an indication that the data in that storage session has been wholly or partially superceded. Thus, storage manager 162 may also comprise means for creating an indication that a copy of at least a portion of a particular file in a storage session has been superceded by a more recent version. Such means may be implemented as previously described.

Finally, after the coalesced version has been created and any indications have been written to the appropriate storage sessions, or to the appropriate indexes wherever they may be stored, the next step may be to write a current version of the coalesced file to archive storage. Thus, embodiments within the scope of this invention may comprise means for writing information to an archive storage medium. In FIG. 7, such means may comprise any mechanism used by storage manager 162 to write information to archive storage 170. Thus, such means may comprise, by way of example and not limitation, archive storage driver 172. Such means may also comprise various components of archive storage communication infrastructure 174, if desirable.

The present invention may be implemented as a service or as processes that run at very low priority during times when the computer system on which they reside is performing no other actions. This is possible because the need to rapidly coalesce various portions of a file into a single version typically does not arise. The more likely scenario is that information is transferred to archive storage over a relatively long period of time. The information is transferred for the possibility that it may one day be needed. However, the anticipated need is generally a long time away. Thus, an embodiment of the invention can generally perform the processing necessary to accomplish the present invention's goals in the background at a low priority.

In summary, the present invention provides mechanisms to simplify the long-term administration of archive storage. These mechanisms include coalescing information from multiple archive storage sessions into a single archive storage session in order to reduce the time necessary to retrieve the desired information. In addition, the present invention helps minimize the logistical problems in managing multiple portions of data scattered across multiple archive storage sessions. The system is robust and may be implemented in a variety of ways. The present invention is easily adapted to many existing systems and the principles enunciated by the present invention may be incorporated into future systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method directed to the long term administration of archive storage in a computer system, wherein at least portions of files are sent to archive storage in at least one session and are stored at different locations in the archive storage and wherein the system produces a index that describes the contents of each session, the method comprising the steps of:

searching an index for each of said at least one session to identify the locations of all portions of a particular file;

identifying the location of the most recent version of all portions of said file; and copying the most recent version of all portions of said file in the proper order to a location in archive storage.

2. A method directed to the long term administration of archive storage as recited in claim 1 wherein the most recent version of all portions of said file are identified by comparing attributes associated with each portion of said particular file.

3. A method directed to the long term administration of archive storage as recited in claim 1 wherein data of said file is stored in at least one allocation unit, said at least one allocation unit having associated therewith an attribute that identifies when the data stored in said at least one allocation unit is updated and wherein the most recent version of all portions of said file are identified by comparing various copies of said attribute.

4. A method directed to the long term administration of archive storage as recited in claim 1 wherein said copying step copies the most recent version of all portions of said file in a new location so as to create a new session.

5. A method directed to the long term administration of archive storage as recited in claim 1 further comprising the step of updating the index associated with each of said at least one session to reflect any data that was copied by said copying step.

6. A method directed to the long term administration of archive storage as recited in claim 1 wherein the index for each of said at least one session is stored on local storage so the step of searching the index for each of said at least one session can be accomplished without accessing archive storage.

7. A method directed to the long term administration of archive storage as recited in claim 1 wherein each of said at least one session has an associated index.

8. A method directed to the long term administration of archive storage as recited in claim 1 wherein said index comprises information for a plurality of said at least one session.

9. A method directed to the long term administration of archive storage as recited in claim 1 wherein said archive storage comprises remote storage.

10. A method directed to the long term administration of archive storage as recited in claim 1 wherein said archive storage comprises local storage.

11. A method directed to the long term administration of archive storage as recited in claim 1 wherein said searching, identifying, and copying steps are performed only after designated criteria are satisfied.

12. A method directed to the long term administration of archive storage in a computer system comprising the steps of:

initiating a plurality of storage sessions wherein at least portions of files are sent to archive storage;

storing an index for each of said plurality of storage sessions, each index comprising at least information that identifies the files transferred to said archive storage in its associated storage session;

searching the index for each of said plurality of storage sessions to identify the locations of all portions of a particular file;

identifying the location of the most recent version of all portions of said file; and copying the most recent version of all portions of said file in the proper order to a location in said archive storage.

13. A method directed to the long term administration of archive storage as recited in claim 12 further comprising the step of updating the index associated with each of said plurality of sessions to reflect any data that was copied by said copying step.

14. A method directed to the long term administration of archive storage as recited in claim 13 wherein the most recent version of all portions of said file are identified by comparing attributes associated with each portion of said particular file.

15. A method directed to the long term administration of archive storage as recited in claim 14 wherein said copying step copies the most recent version of all portions of said file in a new location so as to create a new session.

16. A method directed to the long term administration of archive storage as recited in claim 15 wherein said archive storage comprises remote storage.

17. A method directed to the long term administration of archive storage as recited in claim 15 wherein said archive storage comprises local storage.

18. A method directed to the long term administration of archive storage as recited in claim 16 wherein the index for each of said plurality of sessions is stored on local storage so the step of searching the index for each of said at least one session can be accomplished without accessing said remote archive storage.

19. A method directed to the long term administration of archive storage as recited in claim 18 wherein data of said file is stored in at least one allocation unit and said at least one allocation unit has associated therewith an attribute that identifies when the data stored in said at least one allocation unit is updated and wherein the most recent version of all portions of said file are identified by comparing various copies of said attribute.

20. A system for the long term administration of archive storage comprising:

archive storage means for storing a plurality of archive storage sessions, each of said plurality of storage sessions comprising at least a portion of at least one file;

means for storing an index for each of said plurality of archive storage sessions, each index comprising at least information that identifies the files transferred to said storage means during an associated storage session;

means for determining the most recent version of all portions of a file; and means for coalescing the most recent version of all portions of a file in the proper order in order to create a current version.

21. A system for the long term administration of archive storage as recited in claim 20 further comprising means for indicating that a copy of at least a portion of said particular file in a storage session has been superseded by a more recent version.

22. A system for the long term administration of archive storage as recited in claim 20 further comprising means for creating an indication that a copy of at least a portion of a particular file in a storage session has been superseded by a more recent version.

23. A system for the long term administration of archive storage as recited in claim 20 wherein said means for storing comprises local storage.

24. A system for the long term administration of archive storage as recited in claim 20 wherein said means for determining comprises a signature attribute.

25. A system for the long term administration of archive storage as recited in claim 20 further comprising means for writing a new archive storage session to said archive storage means comprising the most recent version created by said means for coalescing.

26. A system for the long term administration of archive storage as recited in claim 20 further comprising means for initiating a session to coalesce files into updated versions when designated criteria are met.

27. A computer readable media having computer executable instructions comprising:
    means for identifying which of a plurality of archive storage sessions contain at least a portion of a particular file;
    means for determining the most recent version of at least a portion of said particular file from between two copies of said at least a portion of said particular file; and
    means for coalescing the most recent version identified by said means for determining into a single copy of said particular file that contains the most recent version of all portions of said file.

28. A computer readable medium having computer executable instructions as recited in claim 27 further comprising means for writing said single copy to an archive storage medium.

29. A computer readable medium having computer executable instructions as recited in claim 28 wherein said means for writing adds said single copy to an existing archive storage session.

30. A computer readable medium having computer executable instructions as recited in claim 28 wherein said means for writing places said single copy in a new archive storage session.

31. A computer readable medium having computer executable instructions as recited in claim 27 further comprising means for creating an indication that a copy of at least a portion of said particular file in a storage session has been superseded by a more recent version.

32. A computer readable medium having computer executable instructions as recited in claim 31 wherein said means for creating an indication is adapted to modify an index associated with an archive storage session to indicate that at least a portion of a particular file has been superseded by a more recent version.

33. A computer readable medium having computer executable instructions as recited in claim 27 wherein said means for coalescing collects the most recent version from all storage sessions where at least a portion of said particular file reside.

34. A computer readable medium having computer executable instructions as recited in claim 27 wherein said means for identifying examines indexes associated with archive storage sessions to determine what files are stored in the associated archive storage session.

35. A computer readable medium having computer executable instructions as recited in claim 34 wherein said indexes are stored on a local storage means for storing information locally.

36. A computer readable media having computer executable instructions comprising:
    means for identifying which of a plurality of archive storage sessions stored on remote archive storage means contain at least a portion of a particular file;
    means for determining the most recent version of all portions of said particular file, said means for determining comprising means for examining attributes associated with multiple copies of at least a portion of said particular file;
    means for coalescing the most recent version of all portions of said particular file in the proper order in order to create a current version of said particular file from the most recent version of all portions of said particular file in all of said plurality of archive storage sessions;
    means for writing a new archive session containing said current version; and
    means for creating an indication that a copy of at least a portion of said particular file has been superseded by said current version.

* * * * *

UNITED STATES PATENT AND TRADEMARK OFFICE
CERTIFICATE OF CORRECTION

PATENT NO. : 6,023,710
DATED : February 2, 2000
INVENTOR(S) : Stefan R. Steiner, Luis Felipe Cabrera It is certified that error appears in the above-identified patent and that said Letters Patent is hereby corrected as shown below:

Col. 5, ln. 28: after "can" and before "accessed" insert --be--

Col. 6, ln. 52: after "FIG." change "I" to --1--

Col. 7, ln. 24: after "need" and before "be" insert --to--

Col. 11, ln. 48: before "current" change "superceded" to --superseded--

Col. 11, ln. 48: after "superceded" and before "current" insert --by a--

Col. 16, ln. 6: after "portions" change "a the" to --of a--

Signed and Sealed this

Twentieth Day of February, 2001

Attest:

NICHOLAS P. GODICI

Attesting Officer     Acting Director of the United States Patent and Trademark Office